Feb. 16, 1954  A. G. BROWN  2,669,194
ICE-CREAM SCOOP
Filed Aug. 9, 1951

INVENTOR.
ALFRED G. BROWN
BY
ATTORNEYS

Patented Feb. 16, 1954

2,669,194

UNITED STATES PATENT OFFICE 2,669,194

ICE-CREAM SCOOP

Alfred G. Brown, Minneapolis, Minn.

Application August 9, 1951, Serial No. 241,109

1 Claim. (Cl. 107—48)

This invention relates to a new and improved scoop for ice cream and the like, and more particularly to such a device having means therein for ejecting the contents from the scoop.

There are now numerous forms of scoops available for scooping ice cream, and the like, from a container, but to the best of my knowledge, none of these have proven entirely satisfactory, largely because they have been too complicated and expensive to meet the approval of the average householder. Heretofore, the average householder has usually purchased ice cream in small convenient packages from which the ice cream may readily be removed and sliced for serving. This method of purchasing ice cream has been rapidly changing since the advent of deep freeze boxes for freezing and storing frozen food articles. Such freezers, because of the ample storage space provided therein, and moreover, because of the preservative qualities of such freezers, have made it possible for householders to purchase ice cream in relatively larger quantities as, for example, one half-gallon or gallon lots, first, because ice cream may be stored in such an apparatus with utmost safety for a considerable length of time by maintaining its original frozen state, and secondly, because it can be purchased at a relatively lower price in such larger quantities.

Ice cream, when in its normal frozen state, usually requires the use of an implement of some kind to remove it from its container in small quantities, and conventional scoops have usually been employed for that purpose.

The present invention pertains more particularly to an ice cream scoop which may be manufactured at very low cost so that it may be used as an advertising medium to stimulate the sale of a manufacturer's product. In other words, the novel scoop herein disclosed may be inexpensively molded of a plastic material, whereby a manufacturer can well afford to give away such a scoop as a premium with each purchase of a certain quantity of ice cream.

An object of the present invention therefore is to provide an ice cream scoop comprising an open bowl having a handle integrally formed therewith, and a lever member having an ejector finger integrally formed at one end thereof being pivoted in said handle with the ejector finger normally positioned in the bottom of the bowl in such a manner that the scoop may readily be filled with ice cream, regardless of the hardness of the ice cream, and by relatively actuating said lever member, the contents of the scoop may readily be ejected therefrom.

A further object is to provide an ice cream scoop comprising a semi-spherical open bowl having a handle extending laterally therefrom, which handle is of channel cross section with its open side facing upwardly, and an elongated member being pivoted in said handle and having an ejector finger at one end normally seated in an elongated recess provided in the inner surface of the bottom of the bowl, and the opposite end portion of said member normally being positioned above said handle and forming a lever for actuating the ejector finger to eject the contents from the scoop.

A further object is to provide a scoop of the class described comprising a hollow handle having its open side facing upwardly and provided in its bottom with a concave bearing surface, and an elongated member being mounted in said handle and having an ejector finger at one end thereof normally positioned in the bottom of said bowl with its exposed surface coincident with the inner surface of the bowl to provide in effect a continuation thereof, the intermediate portion of said member having a convex bearing surface engaging said concave bearing surface, and a pivot pin inseparably securing said member to the handle to prevent accidental detachment therefrom, said elongated member normally having a portion extending upwardly out of the handle and forming a lever for conveniently actuating the ejector finger to eject the contents from the scoop, said bearing surfaces cooperating to relieve the pivot pin of excessive strains when said member is actuated.

Other objects of the invention reside in the unique design of the scoop whereby it comprises but two major parts which may be molded independently of one another in such a manner that they may readily be united to complete the formation of the scoop with a minimum of labor; in the construction of the scoop handle whereby the elongated cavity formed by its channel cross-section is in direct communication with the interior of the bowl and terminates therein in a longitudinally extending shallow recess formed in the inner surface of the bowl; in the formation of the ejector finger which, when in its normal position in said recess, closes the adjacent end of the cavity in said handle and provides, in effect, a portion of the inner surface of said bowl; and in the provision of the actuating means for said ejector which comprises a lever pivoted to the handle and normally positioned thereabove whereby it may be conveniently manipulated, said lever having a portion extending forwardly and integrally connected to said ejector finger and forming a convenient finger grip to facilitate firmly grasping the scoop, when filling it with a relatively hard material such as ice cream.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claim which follows.

Figure 3:
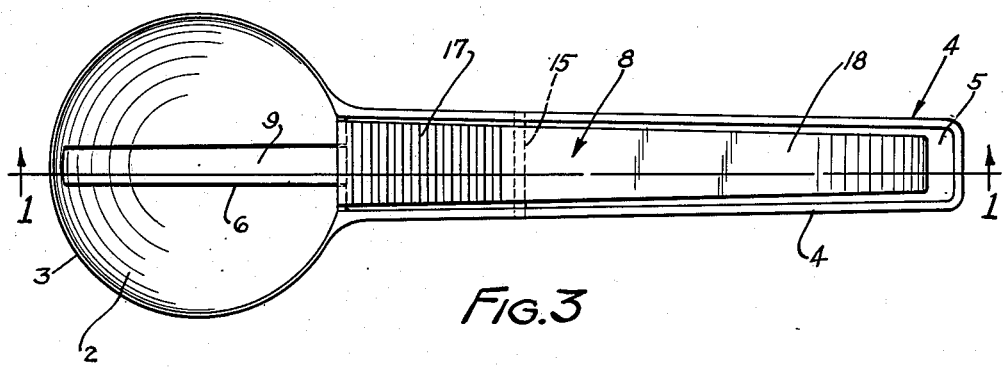
Figure 3 is a plan view of Figure 1.

The novel scoop herein disclosed is shown comprising an open semi-spherical bowl 2, having its upper marginal edge 3 slightly reduced in size to provide a cutting edge to facilitate filling the scoop, particularly when the ice cream or other material to be handled thereby is of relatively hard consistency.

The bowl 2 is shown having a handle 4 extending laterally therefrom which is of channel cross section to provide a cavity 5 having its open side facing upwardly. An elongated shallow recess 6 is provided in the bottom of the bowl 2 and is longitudinally aligned with the cavity 5 in the handle and is in direct communication therewith, as will be understood by reference to Figure 2. An aperture 7 is preferably provided in the bottom of the recess 6 of the bowl to permit drainage from the bowl, and also to prevent the formation of a vacuum in the bottom of the bowl, when the contents are ejected therefrom.

Figure 1:
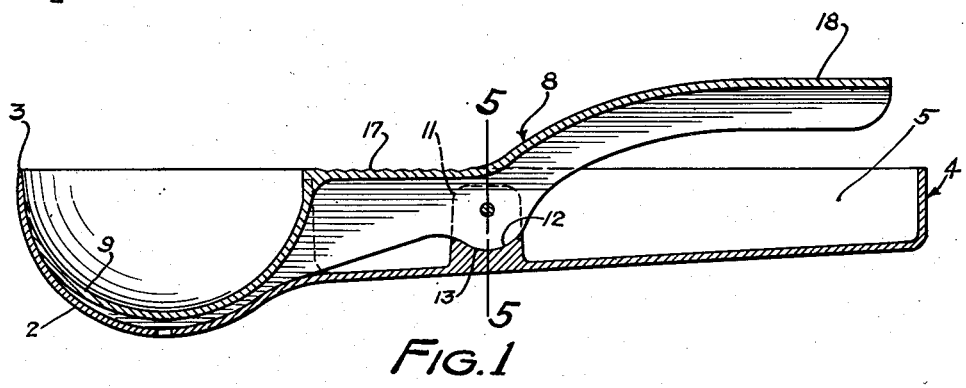
Figure 1 is a longitudinal sectional view on the line 1—1 of Figure 3, showing the ejector finger in its normal position.

An elongated member, generally designated by the numeral 8, is mounted in the handle 4 and is provided at one end with an ejector finger 9 adapted to be received in the elongated recess 6 in the bottom of the bowl, when the ejector finger is in its normal position within the bowl, as illustrated in Figure 1.

Figure 2:
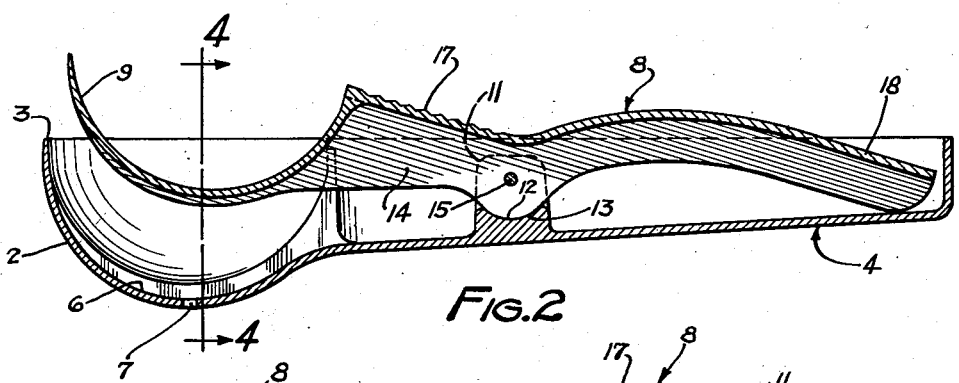
Figure 2 is a view similar to Figure 1, showing the ejector finger actuated to eject the contents from the scoop.
Figure 4:
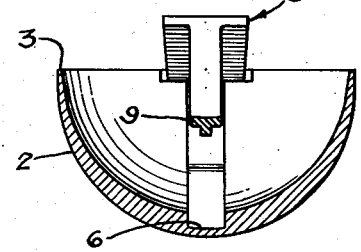
Figure 4 is a detail sectional view on the line 4—4 of Figure 2.
Figure 5:
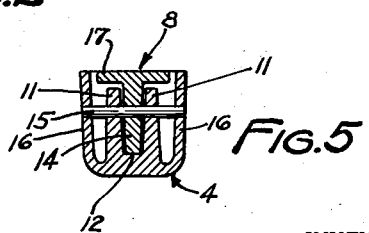
Figure 5 is a detail sectional view on the line 5—5 of Figure 1.

Means is provided in the bottom of the cavity 5 for pivotally supporting the member 8 therein. Such means is clearly illustrated in Figures 1, 2 and 5, and comprises a pair of spaced lugs 11 which preferably are integrally formed with the bottom wall of the handle 4, as shown. The bottom of the gap between the lugs 11—11 has a concave bearing surface 12, as shown in Figures 1 and 2. Seated against the concave bearing surface 12 is a convex bearing surface 13 formed by a portion of a vertically disposed reinforcing rib or web 14, shown integrally formed with the member 8. A pivot pin 15 is received in aligned apertures provided in the side walls 16 of the channel shaped handle 4 of the scoop, and in the lugs 11 and rib 14, as best illustrated in Figure 5.

The elongated member 8 is preferably T-shaped in cross section and has its upper horizontal web portion 17 normally received between the side walls 16 of the handle and forming a closure for the top of the cavity 5 between the pivot pin 15 and the adjacent edge of the bowl 2. The upper surface of the web portion 17 is preferably knurled or transversely ribbed or grooved, as shown in Figures 1, 2 and 3, to provide an anti-slip finger-engaging portion to facilitate manipulating the scoop, as will be understood.

The opposite end portion of the elongated member 8 extends upwardly and horizontally from the pivot pin 15, and provides a lever 18 normally disposed as shown in Figure 1, whereby it may readily be grasped by the operator's hand and depressed into the handle cavity 5, as shown in Figure 2, thereby to actuate the ejector finger 9 to eject the contents of the bowl.

The unique design embodied in the novel scoop herein disclosed makes it possible to quickly and inexpensively mold the two parts thereof in quantity production at a very low cost. The device, as hereinbefore stated, is preferably molded from an inexpensive plastic material of which there are now numerous available, which readily lend themselves for such use. The bearing surfaces 12 and 13 may be completed in the molding operation so that they will not require the services of skilled mechanics to prepare them for use. The pivot pin 15 may be relatively small in size as it functions only to retain the member 8 in position in the handle of the scoop. Stresses exerted upon the lever 18 in the operation of ejecting the contents of the scoop therefrom is taken up entirely by the bearing surfaces 12 and 13, as will readily be understood by reference to Figure 2. In like manner, when the scoop is forced into a frozen mass of ice cream in the operation of filling it, the ejector finger is firmly seated against the bottom of the recess 6 in the bowl and is retained therein by the grasp of the user's hand upon the handle of the scoop, the knurled surface 17 of the forward end of the elongated lever member 8 being firmly engaged by the thumb of the operator so that the ejector finger cannot become damaged from the frozen ice cream as the scoop is forced thereinto.

The scoop also presents the utmost in sanitation in that there are no crevices in which material may be accumulated over a period of use. The open handle and the interior of the bowl may readily be flushed with a cleansing liquid without detaching the member 8 from the handle. However, if so desired, the pivot pin may readily be removed to gain access to the entire cavity 5 of the handle and to the normally concealed surfaces of the member 8.

The foregoing detailed description has been given for clearness of understanding only, and no unnecessary limitations should be understood therefrom, but the appended claim should be construed as broadly as permissible in view of the prior art.

I claim as my invention:

A scoop for ice cream and the like comprising an open bowl having a semi-spherical bottom and having an elongated handle extending laterally therefrom, said handle being U-shaped in cross-section and providing an elongated cavity having its open side facing upwardly, said cavity having one end in communication with the interior of said bowl, the inner surface of the bowl having an elongated recess in its bottom surface longitudinally aligned with the cavity in said handle, an elongated member having its intermediate portion received in said cavity and provided at one end with an arcuately formed ejector finger normally seated against the bottom of the recess in the bottom of the bowl with its entire inner surface substantially flush with the inner surface of said bowl, said elongated member being T-shaped in cross-section and having an enlargement at its intermediate portion provided with a downwardly facing semi-circular bearing portion, a support in the bottom of the elongated recess in the handle for supporting said member, said support having a concave surface against which the semi-circular bearing portion of said member is seated, means for pivotally securing said member to said support, the open end portion of said member curving upwardly and extending rearwardly in the direction of the outer end of the handle and normally disposed in spaced parallel relation to the outer end portion of the handle, thereby to provide a finger-engaging portion for actuating the ejecting finger to eject the contents from the scoop, and the portion of said member between its pivotal connection with the handle and said bowl being normally disposed in the plane in the upper edges of the handle side walls, and providing a finger-engaging portion adapted to be engaged by a finger of the user's hand to facilitate forcing the scoop into a mass of ice cream to load it.

ALFRED G. BROWN.

References Cited in the file of this patent

UNITED STATES PATENTS

| Number | Name | Date |
|---|---|---|
| 540,548 | High | June 4, 1895 |
| 659,146 | Hayden | Oct. 2, 1900 |
| 1,607,765 | Levy | Nov. 23, 1926 |
| 2,165,941 | Price | July 11, 1939 |
| 2,239,046 | Lloyd | Apr. 22, 1941 |
| 2,475,223 | Dawson | July 5, 1949 |